UNITED STATES PATENT OFFICE.

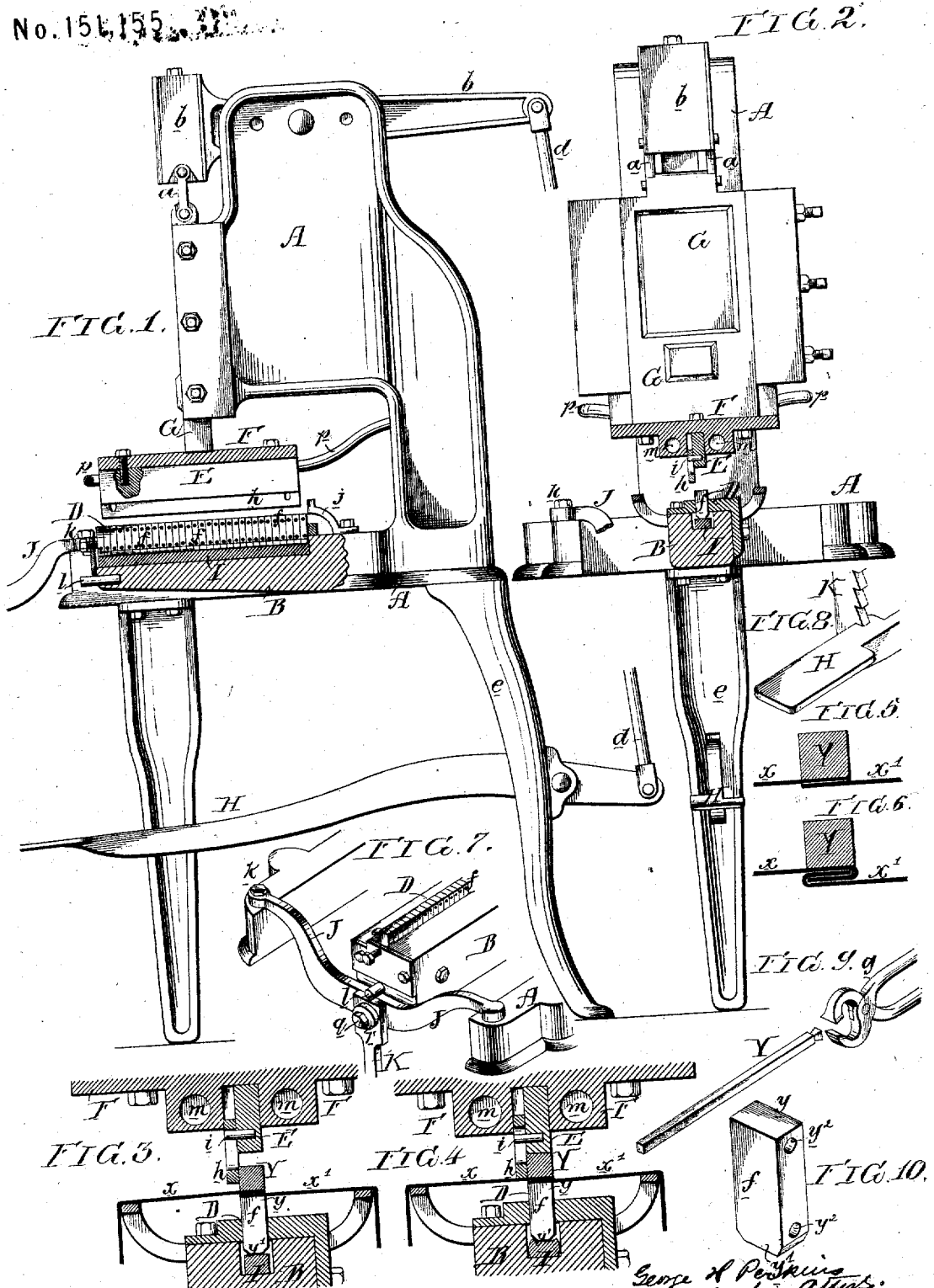

GEORGE H. PERKINS, OF PHILADELPHIA, PENNSYLVANIA, ASSIGNOR TO HIMSELF AND JOSEPH LE COMTE, OF NEW YORK CITY, AND ATLANTIC REFINING COMPANY, OF PHILADELPHIA, PENNSYLVANIA.

IMPROVEMENT IN APPARATUS FOR UNITING TINNED PLATES.

Specification forming part of Letters Patent No. 151,155, dated May 19, 1874; application filed March 18, 1874.

CASE L.

*To all whom it may concern:*

Be it known that I, GEORGE H. PERKINS, of the city of Philadelphia, Pennsylvania, have invented an Apparatus for Uniting Tinned or Amalgam Plates by Heat and Pressure, of which the following is a specification:

The object of my invention is to carry out the heat and pressure process of soldering for which Letters Patent No. 85,742 were granted to Joseph Le Comte on the 12th day of January, 1869, by the mechanism which I will now proceed to describe, reference being had to the accompanying drawing, in which—

Figure 1 is a side elevation, partly in section, of a soldering-press with my improvements; Fig. 2, a front view of the same with the dies in section; Figs. 3 and 4, enlarged sectional views of the dies; Figs. 5 and 6, diagrams illustrative of the operation of soldering by the heat and pressure process; Figs. 7 and 8, perspective views of portions of the press; Fig. 9, a perspective view of the soldering-iron and tongs for carrying the same to and from the furnace; and Fig. 10, a perspective view of one of the reversible sections of the lower die.

The machine to which my improvements are applied is what is commonly known as a "horn-press," so called because the frame A of the press has a projecting arm or horn, B, over which a can or other tubular object of sheet metal can be readily passed, in order to subject it to the action of the dies, the lowermost, D, of which is secured to the said horn, while the upper die, E, is carried by a head, F, secured to a guided plunger, G, operated through the medium of a link, $a$, lever $b$, and connecting-rod $d$, by a treadle, H, hung to the rear leg, $e$, of the press.

In carrying out the heat and pressure process of soldering, the edges of the tinned or amalgam plates $x\,x'$ may be simply lapped, as shown in Fig. 5; or they may be folded in any suitable manner and interlocked, as shown in Fig. 6, the union being affected by the pressure upon the two plates of a heated iron, Y, which melts the tin or amalgam, and thus solders the joint. When the plates are simply overlapped, the pressure must be continued until the iron and plates have cooled; but when the said plates are interlocked, as shown in Fig. 6, this is not absolutely necessary.

It is essential to the successful carrying out of the process that the faces of the upper and lower dies shall be perfectly parallel, in order that the plates may be subjected to a uniform pressure throughout the entire length of the joint. I have ascertained by numerous experiments that this exact parallelism cannot be attained with dies consisting of single pieces of metal, even although one or both be backed by rubber or other yielding material; but by constructing one or both of the said dies of two or more separate pieces arranged side by side, and each backed by a yielding or elastic substance, and admitting of independent adjustment, the most satisfactory results can be obtained. In carrying out this feature of my invention, I prefer to apply it to the lower die only, and to construct the latter of a number of separate sections, $f$, contained within a groove formed for their reception in the arm or horn B of the press, and resting upon a slab or slabs of rubber or other equivalent yielding and elastic substance, I, or upon springs. Each section $f$ is made reversible in its bed, so that one end, $y$, (see Fig. 10,) can be used for the soldering of wide joints, and the opposite beveled end, $y^1$, for the soldering of narrow joints, and the said sections can be readily removed and replaced by inserting a suitable instrument into one of two holes, $y^2$, formed for the purpose in the side of each section. Another important feature of my invention is the use of a loose or detachable soldering-iron, Y, in connection with the upper and lower dies. This iron, which consists in the present instance of a simple square bar, after having been heated uniformly throughout, is carried from the furnace by tongs $g$, Fig. 9, and is laid upon the overlapping portions of the plates $x\,x'$, and directly over the lower die, D, as shown in Fig. 3, its exact lateral position being determined by a slotted gage, h, suspended from pins i at the side of the upper die, E, and its proper longitudinal position by a gage, j, secured to the frame of the press, as shown in Fig. 1. The heated iron having been thus adjusted, the operator, by depressing the treadle H, causes the upper die to descend, and to force the said iron downward upon the overlapping portions of the plates resting upon the lower die, the sections of the latter yielding and accommodating themselves to any inequalities of the iron, so as to insure a uniform pressure upon all portions of the plates to be united, and this pressure being continued until the iron has cooled, when the upper die is raised, the iron and soldered plates removed and replaced by another heated iron and plates, when the same operation is repeated.

It will be observed, on reference to Fig. 3, that when the upper die is raised the slotted gage h hangs downward sufficiently low to determine the position of the heated iron, which is placed against it; but that when the die descends, as shown in Fig. 4, the said gage yields to the sheet-metal plate x, with which it is brought in contact, thus preventing the distortion or bending of the said plate.

In order to prevent the undue heating of the dies and parts adjacent thereto, and to expedite the cooling of the iron, I propose to conduct water through or around the dies. In the present instance channels m are formed in the head F, to which the upper die is secured or of which it forms a part, and cold water is constantly supplied to and caused to flow through the said channels by a hose, p. (See Figs. 1 and 2.) Similar channels may also, if desired, be formed in the horn B, adjacent to the lower die. The yielding or sagging of the horn B, owing to the pressure of the upper die, is prevented by an arm, J, which is adjusted beneath a projection, l, at the outer extremity of the said horn, and rests at its opposite ends upon the frame of the press, as shown in Fig. 7, the said arm being pivoted to the frame at k, so that it can be swung around out of the way when a can or other tubular object has to be adjusted to or removed from the horn.

When the upper die is lowered by means of the treadle H, the latter is caught and retained in its depressed position by a ratchet-bar, K, pivoted to the arm J by a bolt, q. (See Figs. 7 and 8.) A rubber washer, r, upon the bolt q permits the bar K to have a slight lateral movement, sufficient to prevent the breaking or bending of the said bar by striking against the end of the treadle when the arm J is swung suddenly around toward the latter.

It will be understood that, although in the present instance the dies and soldering-iron are perfectly flat and plain, they may be made of any shape to accord with that of the sheet-metal object to be operated upon.

I claim as my invention—

1. A machine for soldering by heat and pressure, in which the upper or lower die, or both, consists of two or more separate pieces, arranged side by side, and combined with rubber or other yielding and elastic material, all substantially as set forth.

2. A machine for soldering by heat and pressure, in which a loose or detachable heated soldering-iron, Y, is combined with upper and lower dies, substantially as and for the purpose described.

3. The sections f of the die, rendered detachable from and reversible upon their yielding bed I, substantially as and for the purpose specified.

4. The combination, substantially as described, of the yielding gage h, with the upper and lower dies and soldering-iron.

5. The combination, substantially as described, of the swinging arm J, its ratchet-bar K, and the treadle H, for operating the upper die.

In testimony whereof I have signed my name to this specification in the presence of two subscribing witnesses.

GEORGE H. PERKINS.

Witnesses:
WM. A. STEEL,
HUBERT HOWSON.